United States Patent
Neugroschel et al.

[15] 3,703,337
[45] Nov. 21, 1972

[54] ANALYZER PROCESSING AND RECORDING TECHNIQUE

[72] Inventors: Eric Neugroschel, Fort Lee, N.J. 07024; Alexander Scott Paterson, Nutley, N.J. 07110

[73] Assignee: Hoffman La Roche Inc., Nutley, N.J.

[22] Filed: Jan. 4, 1971

[21] Appl. No.: 103,546

[52] U.S. Cl. ............... 356/178, 250/218, 324/103 P, 356/206
[51] Int. Cl. ............................................. G01n 21/22
[58] Field of Search....324/73, 103 P, 103 R; 356/81, 356/178, 206, 180, 181, 184, 208; 250/218

[56] References Cited

UNITED STATES PATENTS 2,675,734   4/1954   Hasler et al..................356/81

Primary Examiner—Ronald L. Wibert
Assistant Examiner—Orville B. Chew, II
Attorney—Samuel L. Welt, Jon S. Saxe, Bernard S. Leon and Jacob Frank

[57] ABSTRACT

An apparatus and method for processing and recording data derived from a specimen analyzer for at least two characteristics of the specimen where each of the characteristics is separately detected and stored and then all of the characteristics are simultaneously measured and converted for digital print out.

9 Claims, 4 Drawing Figures

3,703,337

ANALYZER PROCESSING AND RECORDING TECHNIQUE

BACKGROUND OF THE INVENTION

1. Field of the Invention

The present invention relates to improvements in the art of specimen analyzing and, in particular, in the processing and recording of data where two or more characteristics of the specimen are to be read out.

2. Description of the Prior Art

In the field of the automatic analysis of specimens, simultaneous detection, measuring and print out of two or more characteristics of the specimen for visual display is often desired. In many cases, however, simple, economical, yet versatile instrumentation to perform these functions is wanting, especially in providing the display of continuous and very precise and accurate data on a permanent record by print out or other techniques. This holds true whether the devices being used are for monitoring or regulating a chemical production process by analysis, or analyzing biologic material.

SUMMARY

The present invention discloses a method and an apparatus for automatically and simultaneously processing and recording data derived from a specimen analyzer for at least two characteristics of the specimen. Electrical quantities representative of an energy sensing technique employed for analyzing the specimen over some predetermined time period, are closely monitored so that maximum negative and/or positive excursions of an electrical waveform representative of these quantities may be ascertained and temporarily stored for each of the characteristics being analyzed. Upon detection of these excursions for each of the characteristics being analyzed, simultaneous measuring of each excursion is accomplished whereby the analog data is converted to digital form and simultaneously printed out for visual display purposes.

Although the technique taught by the invention may be used in the various specimen analyzing arts having light temperature, heat or other mediums as the sensor input, the technique will be particularly described herein in connection with the use of photo sensors for sensing information from light absorbing, reflecting or emitting samples.

Figure 1:
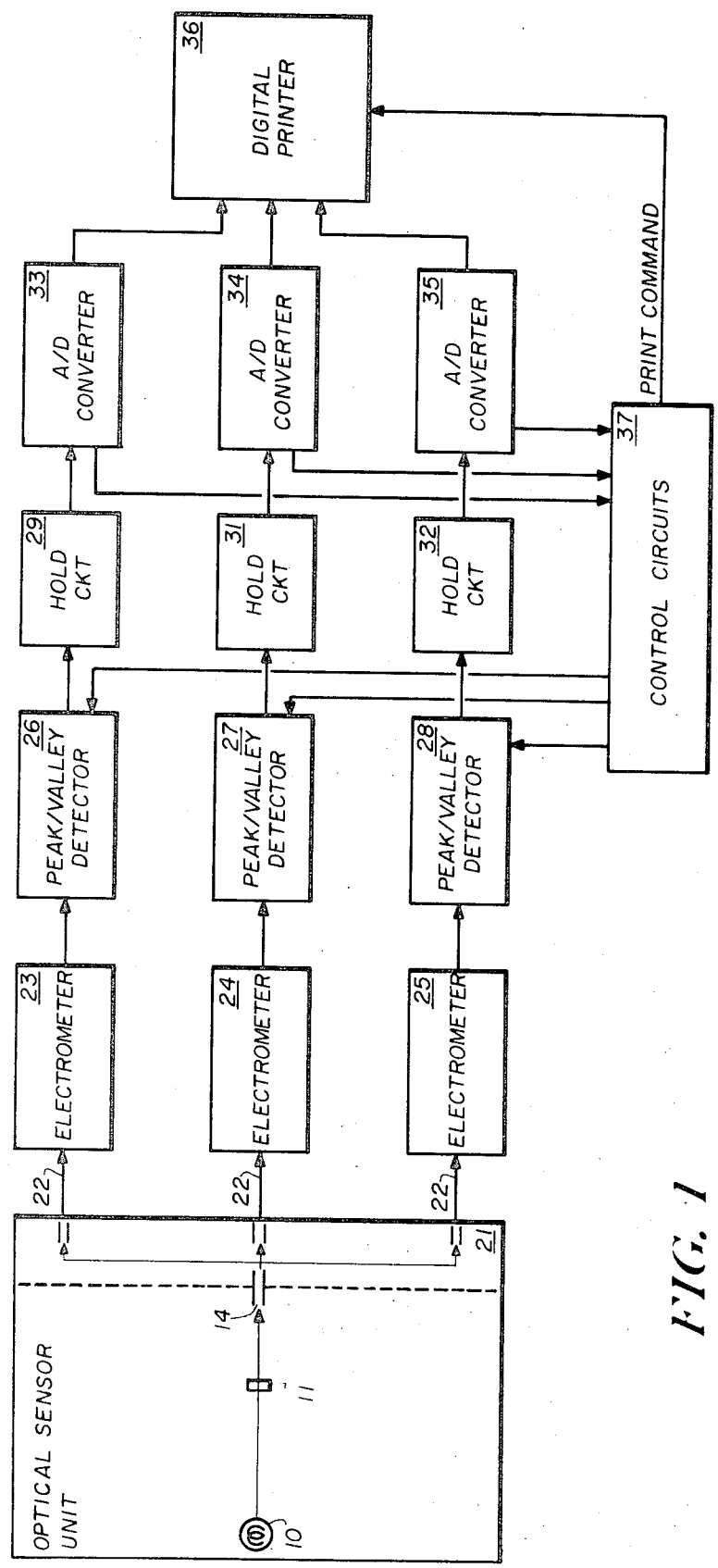
FIG. 1 is a simplified block diagram including the invention.

With respect to the drawings there is shown in FIG. 1, a sensor unit 21 of the optical type such as spectrometer, fluorometer, etc. for simultaneously detecting at three separate light wavelengths a physical characteristic of a solid, liquid or gaseous specimen or sample. Roughly, there is shown in schematic form, a sample holding module 11 of any conventional type to perform a standard procedure on sequential samples. In the sample compartment 11 light is provided from the light sensor 10 in one or more paths. These paths of possibly different wave lengths are formed and each will be directed via fixed slit 14 to separate photo sensors via separate fixed slits.

The three optical device photo sensor outputs 22, are monitored by three identical electrometers 23, 24 and 25 which convert to voltages, input currents from their respective photo sensors. Connected from the output of the electrometers are peak/valley detectors 26, 27 and 28 respectively which are in turn connected to hold or temporary storage circuits 29, 31 and 32 respectively and thence to the analog to digital (A/D) converters 33, 34 and 35, which are collectively coupled to a printer 36. Control circuits 37 which are coupled from the A/D converters are connected back to the peak/valley detectors and to the printer 36. Once a maximum excursion comprising a peak or valley of the converted electrical quantity for a wavelength has been detected, the respective hold circuit will maintain the detected value until the control circuitry determines that a true maximum or minimum has been reached for each one of the three wavelengths or channels. The stored voltages are then severally and simultaneously read into the A/D converters, and a print command is issued which causes the printer to read-out the three values in digital form.

The electrometer outputs may also be fed to a conventional three-pen strip chart recorder giving a time-intensity curve of the specimen flowing through the microcell, for visual display purposes. This provides the operator with a quick and clear concept of the way the system is functioning. Thus, any malfunctioning of the system would soon become obvious to the operator.

Figure 2A:
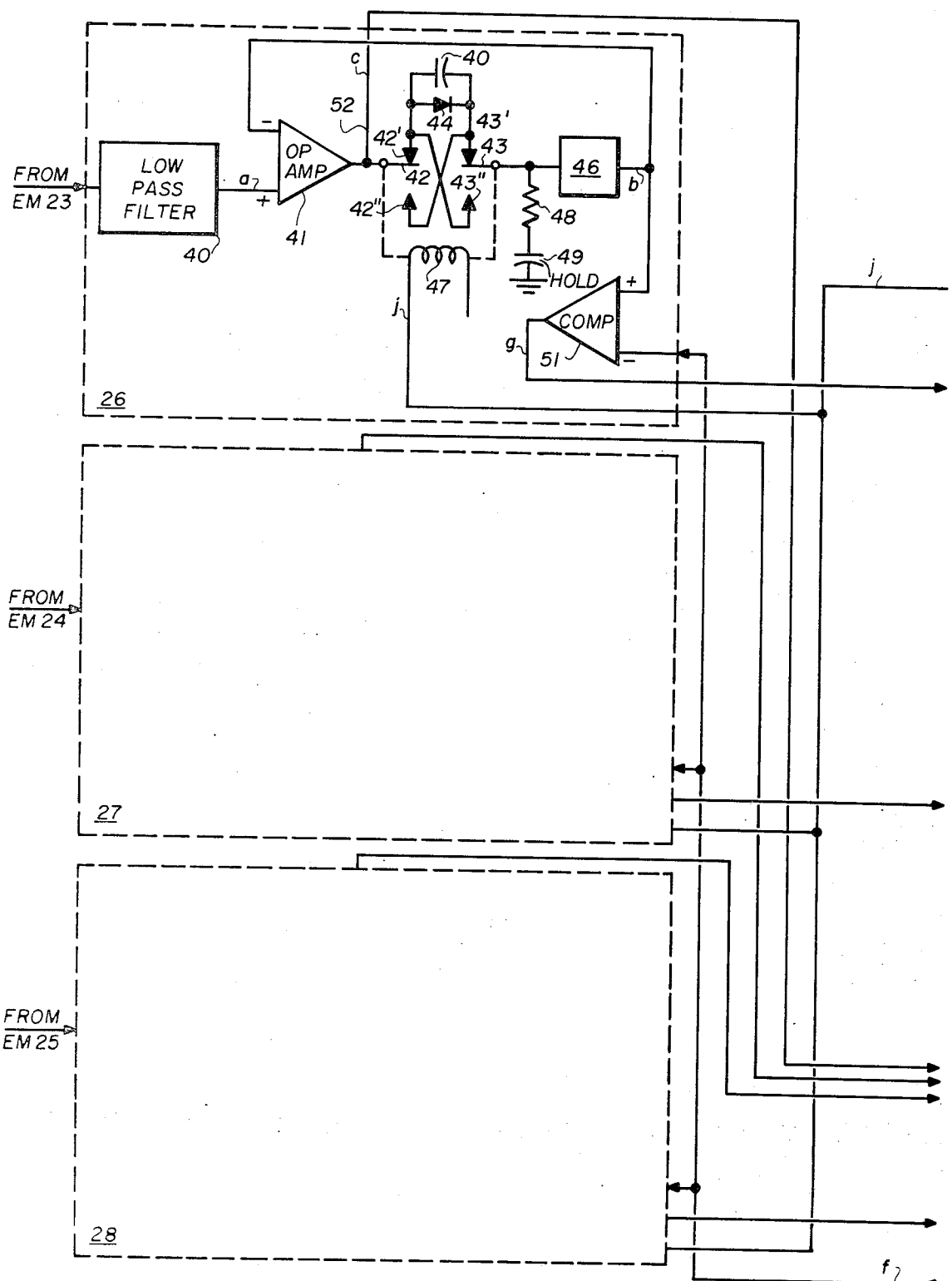
FIGS. 2a and 2b are expanded block diagrams of the peak and valley detectors, hold circuits, A/D converter, and control circuits of FIG. 1.
Figure 2B:
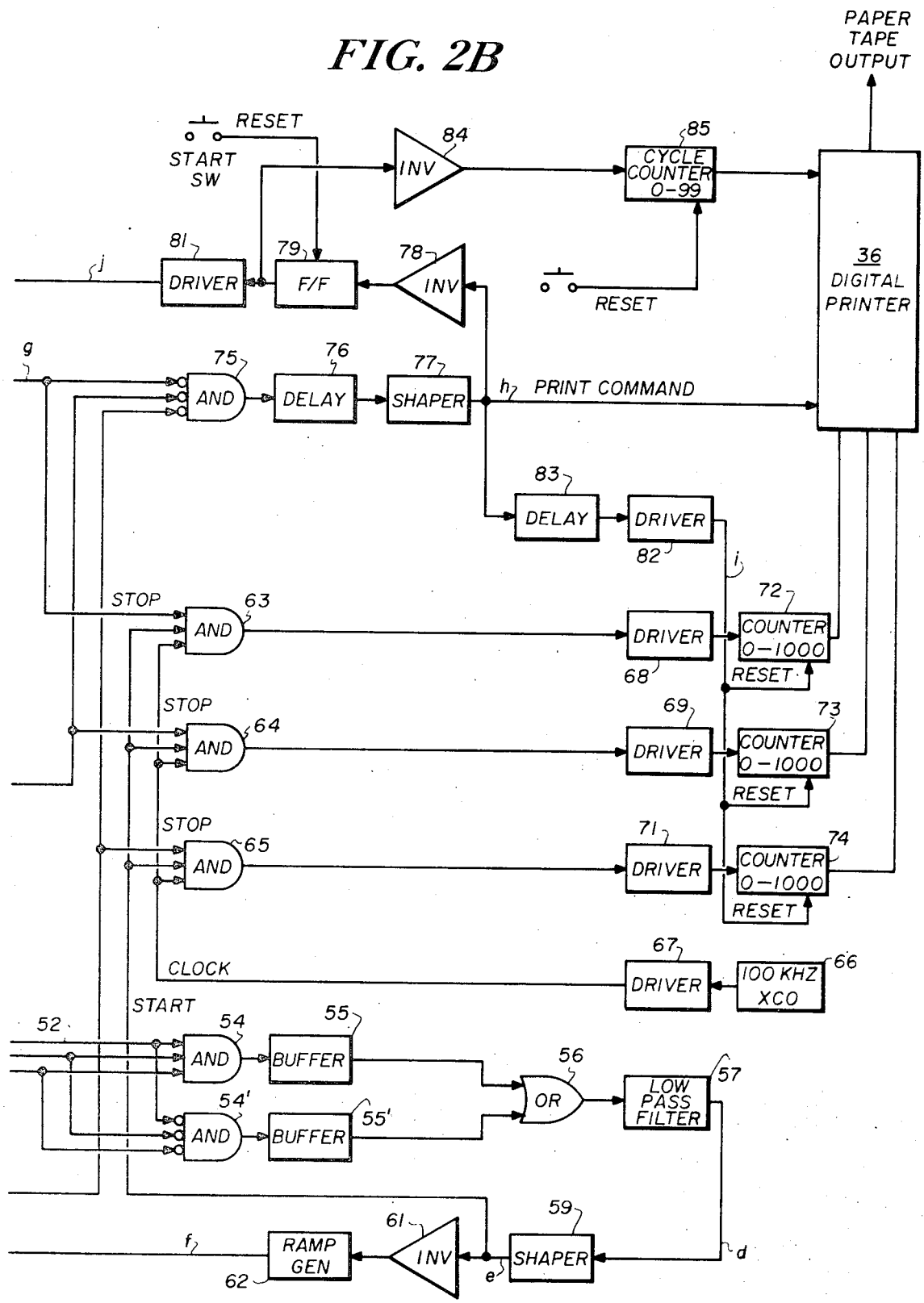

A more detailed block diagram of the present invention is shown in FIG. 2, wherein peak/valley detector 26 of the three identical peak/valley detectors 26-28 is shown to include a low pass filter for removing any higher frequency perturbations, e.g., 1 Hz or above. Filter 40 is connected from electrometer 23 and coupled to a high gain operational amplifier 41 which in turn is connected at its output via switch 42 of relay 47 to one of two contact points 42' or 42" and via lead 52 to the control board circuitry.

A capacitor 40 and diode 44 are connected in parallel between contact points 42', 42" and 43', 43". Diode 44 has a high blocking impedance to act as a good open circuit when a voltage reversal of the input signal occurs. Connected between switch 43 and ground is a resistor 48 connected in series with hold capacitor 49. Switch 43 of relay 47 is connected to the input of a high impedance buffer amplifier 46 which prevents the stored potential on hold capacitor 49 from leaking. The output of buffer amplifier 46 is connected within a feedback loop from the operational amplifier output back to a second input of operational amplifier 41, and is also connected to one input of the comparator unit 51. Because of inclusion of the high input impedance buffer 46 in the feedback loop to the operational amplifier, the peak/valley detector holds for long periods of time, very accurate values stored on hold capacitor 49. Relay 47 from the control board circuitry is utilized for manipulation of switches 42 and 43 to obtain diode reversal. Collectively coupled to each AND gates 54 and 54' are: branches of output lead 52 of operational amplifier 41, and; the respective operational amplifier output leads from peak/valley detectors 27 and 28. An OR gate 56 is coupled from these AND gates via buffers 55 and 55' respectively, and connected to a low pass filter 57 and then to a shaper circuit 59 such as a Schmitt trigger. Low pass filter 57 comprises an RC timing circuit of a preselected duration sufficient to prevent formation of a shaper trigger output as a result of dips or slight irregularities due to noise, perturbations, etc., in the input signals from the optical device photo sensors to the peak/valley detectors. The output of shaper circuit 59, which, provides a sharp pulse leading edge, is connected to inverter unit 61 and thence to ramp generator 62 which is coupled to a second input of the comparator circuit 51 as well as the comparator circuits of peak/valley detectors 27 and 28 for measuring the stored values of the maximum and/or minimum values of the input waveform.

The output of comparator unit 51 and its identical units in peak/valley detectors 27 and 28 are respectively fed to AND gates 63, 64 and 65. The second input to each of these AND gates is also connected from the output of shaper circuit 59. The third input to each of these AND gates is further connected from a 100 kilohertz crystal oscillator 66 via divider unit 67 to provide a series of clock pulses for counting purposes. Each of the AND gates 63, 64 and 65 is respectively connected to the input of a driver unit 68, 69 and 71, and thence to respective counting units 72, 73 and 74 which feed the input of digital printer 36.

With reference back to comparator circuit 51 it is noted that this unit output and the identical comparator circuit outputs of peak/valley detectors 27 and 28, are also collectively coupled to an AND gate 75, and thence to a shaper unit 77 via delay circuit 76. The output of shaper 77 is connected for enabling a print out from digital printer 36. In addition, shaper 77 through an inverter 78, flip-flop 79 and driver 81 energizes relay 47 of peak/valley detector 26 and its identical relays in detectors 27 and 28, so that the input waveform signals from the electrometers are supplied to the reverse side of diode 44 and its equivalent diodes in the other detection circuitry. Further, the output from shaper 77 is coupled to driver 82 via delay circuit 83 and thence to each of the counters 72, 73 and 74 for reset purposes. The output of flip-flop unit 79 is also connected to an inverter 84 and thence to a cycle counter 85 and digital printer 36 so that with each alternate reversal of the diode 44 a signal will also be applied to the digital printer 36 for maintaining a record of the number of maximum-minimum cycles in a run.

OPERATION

Figure 3:
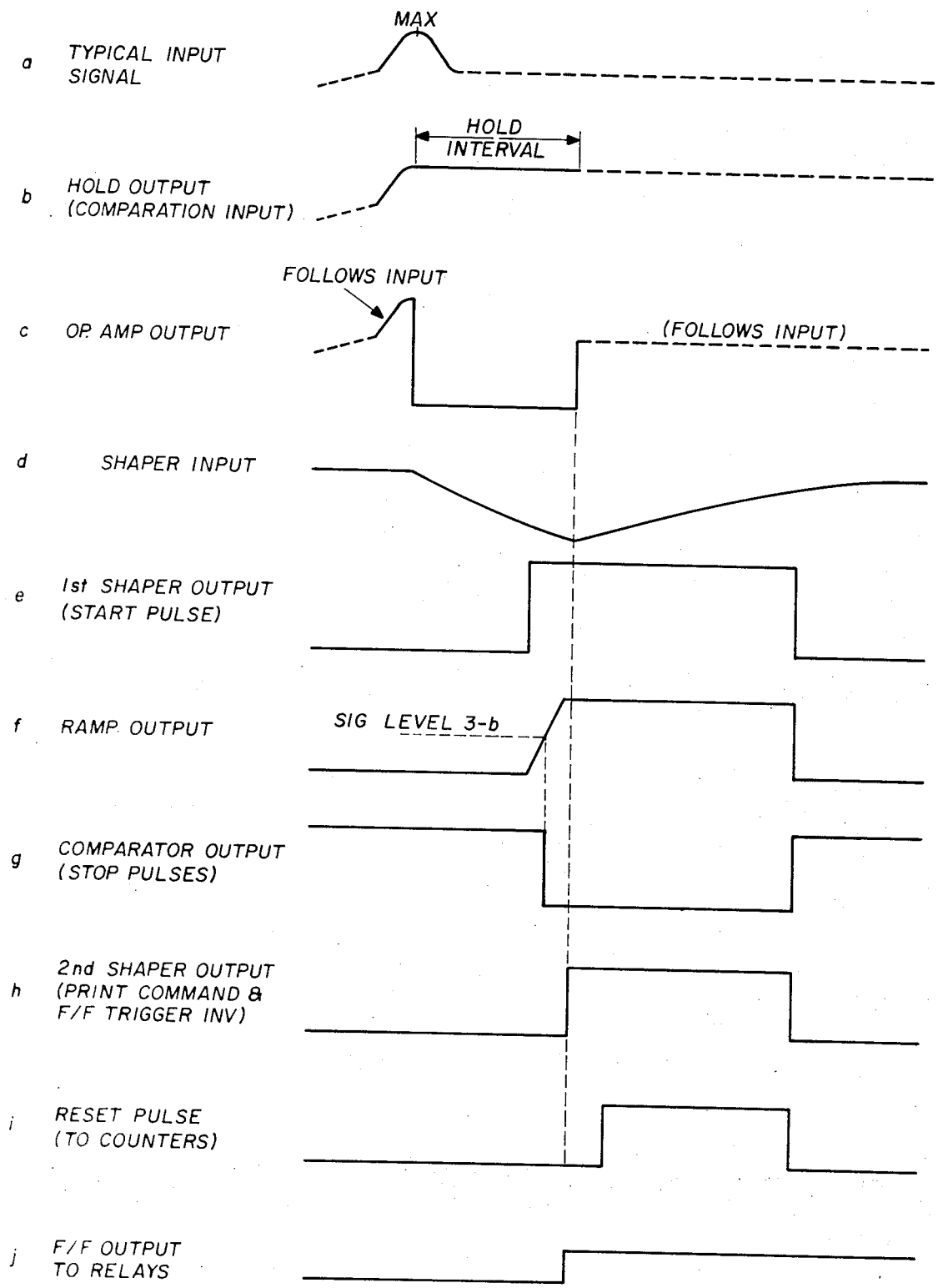
FIG. 3 is an electrical waveform diagram of time versus potential whereby each of the waveforms, a through j, may be found at the respective points shown in FIG. 2.

In operation of the present invention, reference will also be made with regard to FIG. 3 which illustrates typical waveforms, under normal operation, at various points of the system for the particular embodiment made reference to. After the photo sensor current has been converted to a voltage by the electrometer 23, input signals, such as that shown at 3–a, will be fed to the operational amplifier. With relay 47 set as illustrated, as a peak voltage is approaching, the loop comprising operational amplifier 41, diode 44 and buffer amplifier 46 acts as an accurate unity-gain amplifier effectively coupling the input signal to comparator circuit 51. While the loop is closed the voltage at the buffer output is equal to the input of the operational amplifier from the electrometer. During this period the output of the operational amplifier 41 will follow the input signal as shown to maintain a positive output at the plate of diode 44. Before the peak voltage of the input signal is hardly passed, voltage fed back to the negative input terminal of the operational amplifier from buffer 46 will exceed the input positive voltage to the operational amplifier to provide a negative differential output and in effect instantly back-bias diode 44 to open up the loop causing capacitor 40 and buffer 46 to now form a hold circuit to maintain the existing potential on hold capacitor 49 and the peak/valley at the positive input to comparator 51 for the period of the hold interval shown. Such a circuit is highly suitable for long holding action for waveforms that are slow in nature. At this point the negative voltage then present at the output of operational amplifier 41 will now qualify one of the inputs to the negative AND gate 54'.

When all three channels to the input of negative AND gate 54' are qualified the AND gate is enabled and starts charging low pass filter 57 through buffer 55' and OR gate 56, to fire shaper 59 a predetermined time period after the peak. As shaper 59 fires, as illustrated in FIG. 3–e, two events occur simultaneously. First, inputs to AND gates 63, 64 and 65 are qualified, and since the comparator inputs normally qualify these same gates also, clock pulses from crystal oscillator 66, enter each of the three counters 72, 73 and 74. Secondly, the ramp generator 62 output voltage starts rising linearly as is illustrated at 3–f, and ultimately, the ramp input to comparator 51 reaches the voltage level of the stored input peak from the buffer (see 3–b) and the comparator will fire to provide a stop pulse 3–g to disqualify its respective AND gate 63, thus stopping counter 72. Comparator units for peak/valley detectors 27, 28 will also similarly disqualify AND gates 63 and 65. The counters 72–74 will then each contain a digital number which accurately represents the peak related to its respective input at electro-meters 23–25. The comparator output stop pulses of each of the channels in addition to being fed to AND gates 63, 64 and 65 are collectively fed to AND gate 75 to enable the printer via delay unit 76 and shaper unit 77 allowing all three channels to have first registered on their respective counters 72– 74, allowing the three digital numbers representative of the maximum excursion values to be printed out.

This print command also changes the stage of flip-flop 79 causing the relays in each of the peak/valley detectors 26 through 28 to switch and prepare the analog channels to detect a minimum excursion in lieu of the peak excursion when this is desired. In addition, the change of state of flip-flop 79 advances the cycle counter 85.

Subsequent to all three peak/valley detectors of each of the channels having been energized to detect a minimum within each of these channels, when all three minimums have been detected, AND gate 54 will be qualified, otherwise the sequence of events is exactly as that described above for detection of a maximum excursion in each of the channels.

While we have particularly shown and described a preferred embodiment of the invention in the foregoing disclosure, it should be understood, of course, as noted above, that numerous modifications or alterations may be made therein without departing from the spirit and the scope of the invention. For example, although the present embodiment is shown to first be set up to detect maximum positive excursions and then maximum negative excursions, the apparatus may be modified to be reset with each cycle to detect either successive maximum positive excursions or successive maximum negative excursions or any combination of the two. Accordingly, it is desired, therefore, that only such limitations be placed on the invention as are imposed by the prior art and as set forth in the appended claims.

What is claimed is:

1. Apparatus for processing and recording data derived from a specimen analyzer for at least two characteristics of the specimen comprising;
   transducer means for transforming into a separate analog electrical signal each of the specimen characteristics analyzed,
   separate detector means responsive to indeterminant maximum excursions for each of said electrical signals and providing a conditioning signal denoting a maximum excursion signal value has sensed, sensed
   separate storage means for temporarily storing each of the maximum excursion electrical signal values sensed by the respective detector means,
   measuring means energizable to simultaneously measure each of the stored maximum excursion electrical signal values,
   control means responsive to the conditioning signals, upon detection of all of said maximum excursion electrical signal values by said detector means, for energizing said measuring means, and
   output means for simultaneously reading out and displaying the said measured signal values.

2. Apparatus according to claim 1 wherein said detector means includes, electrical signals,
   circuit means for selectively responding to maximum positive or negative excursions for each one of the electrical signals, and
   switching means which upon being energized enables said circuit means to alternately respond to maximum positive excursion and maximum negative excursions.

3. Apparatus according to claim 1 wherein said output means includes,
   means for converting said analog signals to digital signals whereby said conversion means is energized coincident with said measuring means.

4. Apparatus according to claim 1 wherein said measuring means includes,
   ramp generator means, and
   comparator means for and connected from each of said storage means, and connected from said generator means.

5. Apparatus according to claim 1 wherein said control means includes,
   AND gate means connected from each of said detector means and adapted to energize said ramp generator means upon detection of maximum excursion values for all of said characteristics.

6. Apparatus according to claim 1 wherein said control means includes,
   integrating means for preventing signal irregularities from energizing said measuring means.

7. An analyzing system for simultaneously and automatically processing a physical characteristic of a specimen wherein a sensor unit simultaneously receives preselected light wavelengths passing through a specimen to provide light wave signals at two or more wavelengths indicative of certain values of the physical characteristic of the specimen comprising,
   transducer means for transforming into a separate electrical analog signal, the values of the specimen at each of said wavelengths,
   separate detector means responsive to indeterminant maximum excursions for each of said electrical signals and providing a conditioning signal denoting a maximum excursion signal value has been sensed,
   separate storage means for temporarily storing each of the maximum excursion electrical signal values sensed by the respective detector means,
   measuring means energizable to simultaneously measure each of the stored maximum excursion electrical signal values,
   control means responsive to the conditioning signals upon detection of all of said maximum excursion electrical signal values by said detector means, for energizing said measuring means, and
   output means for simultaneously reading out and displaying the said measured signal values.

8. A method of processing and recording data simultaneously derived from a specimen analyzer for at least two characteristics of the specimen comprising;
   converting each of the specimen characteristics analyzed into separate electrical analog signals,
   separately detecting indeterminant maximum excursions for each of said electrical signals and providing a conditioning signal upon such detection,
   temporarily storing each of the detected maximum excursion electrical signal values,
   simultaneously measuring each of the stored values, in response to the conditioning signals upon detection of all of the maximum excursion values, and
   reading out and displaying the measured values.

9. Apparatus according to claim 1 wherein said detector means includes,
   comparator means for continuously comparing the temporarily stored signal value with the input analog signal value and responsive upon the stored signal value exceeding the input analog signal value, for providing said conditioning signal.

* * * * *

UNITED STATES PATENT OFFICE
CERTIFICATE OF CORRECTION

Patent No. 3,703,337　　　　　　　Dated　November 21, 1972

Inventor(s)　Neugroschel and Paterson

It is certified that error appears in the above-identified patent and that said Letters Patent are hereby corrected as shown below:

Column 5, line 26 of Claim 1

"has sensed, sensed"

should be　　has been sensed

Column 5, line 41 of Claim 2

"includes, electrical signals"

delete electrical signals

Signed and sealed this 1st day of May 1973.

(SEAL)
Attest:

EDWARD M. FLETCHER, JR.　　　　ROBERT GOTTSCHALK
Attesting Officer　　　　　　　　Commissioner of Patents